(12) United States Patent
Stewart

(10) Patent No.: US 7,849,253 B2
(45) Date of Patent: Dec. 7, 2010

(54) METHOD FOR FAST ACCESS TO FLASH-MEMORY MEDIA

(75) Inventor: Guy A. Stewart, Leander, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 495 days.

(21) Appl. No.: 11/098,707

(22) Filed: Apr. 4, 2005

(65) Prior Publication Data

US 2006/0224818 A1    Oct. 5, 2006

(51) Int. Cl.
*G06F 12/06* (2006.01)
(52) U.S. Cl. .............. 711/103; 711/202; 711/205; 711/206; 711/209
(58) Field of Classification Search ........... 711/103, 711/200–207
See application file for complete search history.

(56) References Cited

U.S. PATENT DOCUMENTS

| 6,026,465 | A | 2/2000 | Mills et al. | |
|---|---|---|---|---|
| 6,505,283 | B1 * | 1/2003 | Stoney | 711/170 |
| 6,948,026 | B2 * | 9/2005 | Keays | 711/103 |
| 7,139,864 | B2 * | 11/2006 | Bennett et al. | 711/103 |
| 7,340,581 | B2 * | 3/2008 | Gorobets et al. | 711/202 |
| 2003/0070035 | A1 * | 4/2003 | Wang | 711/103 |
| 2003/0163630 | A1 * | 8/2003 | Aasheim et al. | 711/103 |
| 2004/0057316 | A1 * | 3/2004 | Kozakai et al. | 365/222 |
| 2005/0005057 | A1 * | 1/2005 | Wang | 711/103 |
| 2006/0106969 | A1 * | 5/2006 | Hoogerbrugge | 711/1 |

OTHER PUBLICATIONS

Chiang et al., "Partitioned Log-based Flash Memory management and adaptive cleaning,"International Symposium On Consumer Electronics 2000; Dec. 5-7, 2000, Hong Kong.
SMIL (SmartMedia Interface Library), Software Edition, Version 1.00; Toshiba Corporation; Jul. 1, 2000.
SCSI-3 Block Commands (SBC), Revision 8c, ANSI NCITS 306-199x; American National Standard for Information Technology; Nov. 13, 1997.
Design of a solid-state file using flash EEPROM, by H. Niijima; IBM J. Res. Develop. vol. 39 No. 5; Sep. 1995.

* cited by examiner

*Primary Examiner*—Kevin L Ellis
*Assistant Examiner*—Alan Otto
(74) *Attorney, Agent, or Firm*—Meyertons Hood Kivlin Kowert & Goetzel, P.C.; Jeffrey C. Hood

(57) ABSTRACT

In one embodiment, the invention comprises a flash-media controller used for writing new data from an external system to a local flash-memory device. The newly written data may replace old data previously written to the flash-memory device, and may be written directly to unused locations within the flash-memory device. The flash-media controller may comprise a table of block descriptors and sector descriptors used to track specified characteristics of each block and sector of the flash-memory device, thereby allowing for write sequences to non-contiguous sectors within a block. Accordingly, copy operations may be deferred under the expectation that they will eventually become unnecessary, thereby designating old data as having become stale. Once all data within a block has been designated as being stale, the block may be marked as unused and may be made available for subsequent write operations, thereby providing fast write access to the flash-memory device, and significantly reducing the number of required copy operations during data transfer to the flash-memory device.

32 Claims, 7 Drawing Sheets

| Size | Blocks | Pages/block | Pages (total) | Sectors/block | Sectors (total) |
|---|---|---|---|---|---|
| 128MB | 8191 | 32 | 262,144 | 32 | 262,144 |
| 128MB | 1024 | 64 | 65,536 | 256 | 262,144 |
| 256MB | 2048 | 64 | 131,072 | 512 | 524,288 |

*FIG. 1*

ABSTRACT US 7,849,253 B2

METHOD FOR FAST ACCESS TO FLASH-MEMORY MEDIA

BACKGROUND OF THE INVENTION

1. Field of the Invention

This invention relates generally to the field of digital interface design and, more particularly, to digital storage interface design.

2. Description of the Related Art

In recent years the electronics marketplace has seen a proliferation of appliances and personal electronics devices that use solid-state memory. For example, traditional film cameras have been losing market share to digital cameras capable of recording images that may be directly downloaded to and stored on personal computers (PCs). The pictures recorded by digital cameras can easily be converted to common graphics file formats such as JPEG, GIF or BMP, and sent as e-mail attachments or posted on web pages and online photo albums. Many digital cameras are also capable of capturing short video clips in standard digital video formats, for example MPEG-2, which may also be directly downloaded and stored on PCs or notebook computers. Other devices that typically use solid-state memory include personal digital assistants (PDAs), pocket PCs, video game consoles and MP3 players.

The most widely used solid-state memory devices comprise flash-memory chips configured on a small removable card, and are commonly referred to as flash-memory cards. The majority of flash-memory cards currently on the market typically comprise one of four different types: Compact Flash, Multi Media Card (MMC) and the related Secure Digital Card (SD), SmartMedia, and Memory Stick. Most digital cameras, for example, use Compact Flash cards to record images. Many PDA models use Memory Stick cards to hold data. Some MP3 players store music files on Smart Media cards. Generally, data saved by PDAs and other handheld devices using flash-memory cards are also transferred or downloaded to a PC. In the present application, the term "flash-memory" is intended to have the full breadth of its ordinary meaning, which generally encompasses various types of non-volatile solid-state memory devices.

Generally, data in flash-memory devices may be erased in units of blocks and written in units of pages. Blocks typically designate a minimum Erasable Unit (EU), and consist of a plurality of pages, which serve as a minimum Read/Write Unit (RWU). A block must typically be erased in its entirety before data can be updated (re-written). In other words, flash-memory is typically used as a file store. File systems usually maintain data on the device in units of 512 bytes, commonly called sectors. The table in FIG. 1 illustrates the page/block/sector organization of several common flash-memory devices.

An external system typically transfers data to a flash-memory device in sets of contiguous sectors using a logical sector address and a sector count. A flash-media controller may be used to translate the logical sector address provided by the external system into a physical sector address on the flash-memory device. By convention, contiguous logical sectors that fall within the address range of a logical block are stored contiguously within the same physical block. The convention to keep sectors contiguous has several motivating factors. One is to avoid the cost of memory intensive look-up tables used to associate each logical sector with a physical sector. For example, a 128 MB flash-memory device will typically have 262,144 sectors. A per-sector lookup table would require at least one megabyte of storage. Another motivating factor is due to external systems typically transferring data in contiguous sectors using a first sector address and a sector count. Keeping the physical sectors contiguous generally erases a time penalty associated with a table lookup for each sector involved in the transfer.

Blocks may sometimes contain physically damaged electrical components. Damaged blocks are typically marked as invalid and are not used to store data. External systems are generally not designed to manage invalid blocks. Therefore, the flash-media controller must maintain a table of replacement blocks. This table may be used to translate logical addresses provided by external systems into physical addresses of valid blocks on the flash memory. Since some physical blocks may be invalid, it is not always possible to store logical blocks contiguously on the flash memory device.

External systems also frequently update (re-write) existing data. These updates take place within a few sectors of a block. A flash-media controller must typically establish a set of unused (or erased) pages to receive incoming data. Previously written data that falls outside the range of the current write operation must be preserved. Rewriting data on a flash memory device often entails re-arrangement of existing data using copy operations. As previously noted, this re-arrangement is necessary in order to maintain contiguous data and thereby minimize resources required to locate previously written data. The copy operations are generally time costly and interrupt the continuous flow of data from the external system to the flash memory, thereby reducing the overall write speed of the device.

There are currently a variety of methods used for re-arranging existing data on flash-memory devices. Sometimes, random access memory (RAM) or static random access memory (SRAM) resources are used for caching data prior to writing to the flash-memory device. At other times the data may be written to available read/write units and maintaining contiguous data may not even be attempted. One method involves assuming linear (contiguous) writes, and maintaining contiguous data by keeping a next-sector pointer. Relevant examples of current methods are presented in SMIL (SmartMedia™ Interface Library) Software Edition Version 1.00, Toshiba Corporation, published on Jul. 1, 2000, and in SMIL™ Standard 2000 Supplement Vol. 1, issued on Nov. 20, 2000 as part of the SSFDC Forum Technical Reference.

Caching solutions typically require significant temporary storage external to the flash-memory device, such as RAM or SRAM. Small inexpensive devices do not have storage sufficient for large re-write operations. Adding external storage resources typically adds significantly to the cost and complexity of the device. Resolving this issue may necessitate a mechanism to eliminate copy operations without requiring temporary storage external to the flash memory. Writing the data to available non-contiguous read/write units generally requires a larger and more complex lookup table. Larger flash memory devices may contain many thousands of read/write units, making the size of the lookup table prohibitive for a small inexpensive flash media controller.

Other corresponding issues related to the prior art will become apparent to one skilled in the art after comparing such prior art with the present invention as described herein.

SUMMARY OF THE INVENTION

Various embodiments of a system and method to significantly reduce the number of data copy operations performed during the transfer of data to a flash-memory device are presented. In one embodiment, a memory controller is used to manage non-volatile memory devices, for example flash-memory devices (flash electrically erasable programmable read only memory, otherwise referred to as flash EEPROM), where transferring data to the flash-memory devices is performed such that unnecessary and time costly operations, as well as memory intensive data structures related to the management of the flash memory devices are minimized. The data may be maintained contiguously, thereby minimizing the storage requirements of corresponding lookup tables. Copy operations may be reduced or eliminated by deferring them as long as possible. The size and extent of structures used to describe the deferred copy operations may be limited, in turn minimizing RAM requirements.

The non-volatile memory device may be organized into a plurality of minimum erasable-units called blocks, and each block may be organized into a plurality of subunits called sectors. In one set of embodiments, re-write operations to a flash-memory device may be allowed to partially complete by skipping the final copy phase, and a descriptor of the current state of the re-write operation may be maintained in a RAM cache. The descriptor may identify which sectors of a block have been involved in the re-write operation. The descriptor may also be updated as subsequent re-write operations are initiated referencing the same block. The cache may contain descriptors for a plurality of partially re-written blocks. A block's descriptor may be removed from the RAM cache once all the block's sectors have been re-written. Upon reaching cache resource limits, the descriptors may be removed from the cache after forcing completion of deferred copy operations.

In one embodiment, the flash media controller includes a table of block descriptors—each block being identified as a minimum erasable-unit—that may be configured to hold physical block address information, logical block address information, as well as status information pertaining to the physical and logical blocks. In one embodiment, physical blocks that are partially re-written (when the data is divided across two or more physical blocks) receive a corresponding sector descriptor. Each sector descriptor may contain information about the physical sectors contained in a physical block, as well as information regarding data contained in the physical sectors. When an external system requests a re-write operation, the flash-media controller may locate a candidate block, whose attributes meet a previously determined set of criteria, and designate a candidate physical block based on another set of previously determined criteria. The re-write operation may then be processed using the candidate physical block.

The flash-media controller may reclaim resources at will. Reclamation may be necessary due to resource constraints such as limited storage for sector descriptors or a limited number of unbound blocks. Reclamation may be desired to improve performance of read operations or to simplify fault recovery. Resources associated with a partially re-written block may be reclaimed by first selecting a candidate physical block for reclamation, then selecting a subsequent partially re-written physical block associated with the same logical block. Dormant sectors from the candidate block may be copied to the subsequent block, where a dormant sector may be defined as meeting a previously established set of criteria. The flash-media controller may then update the dirty-sector map associated with the subsequent block to reflect the sectors copied in the prior step, and reclaim the sector descriptor associated with the candidate physical block. Subsequently, the flash-media controller may mark the candidate physical block as unbound in the associated block descriptor.

Thus various embodiments of the invention offer a system and method for providing fast write access to flash-memory media while significantly reducing the number of data copy operations performed during the transfer of data to the flash-memory media. New data may be written directly to the flash-memory media without first being cached, and a sequence of re-write operations may target non-contiguous sectors of any given block or blocks.

BRIEF DESCRIPTION OF THE DRAWINGS

The foregoing, as well as other objects, features, and advantages of this invention may be more completely understood by reference to the following detailed description when read together with the accompanying drawings in which:

FIG. 1 illustrates the organization of several common flash-memory devices, according to prior art;

Figure 2:
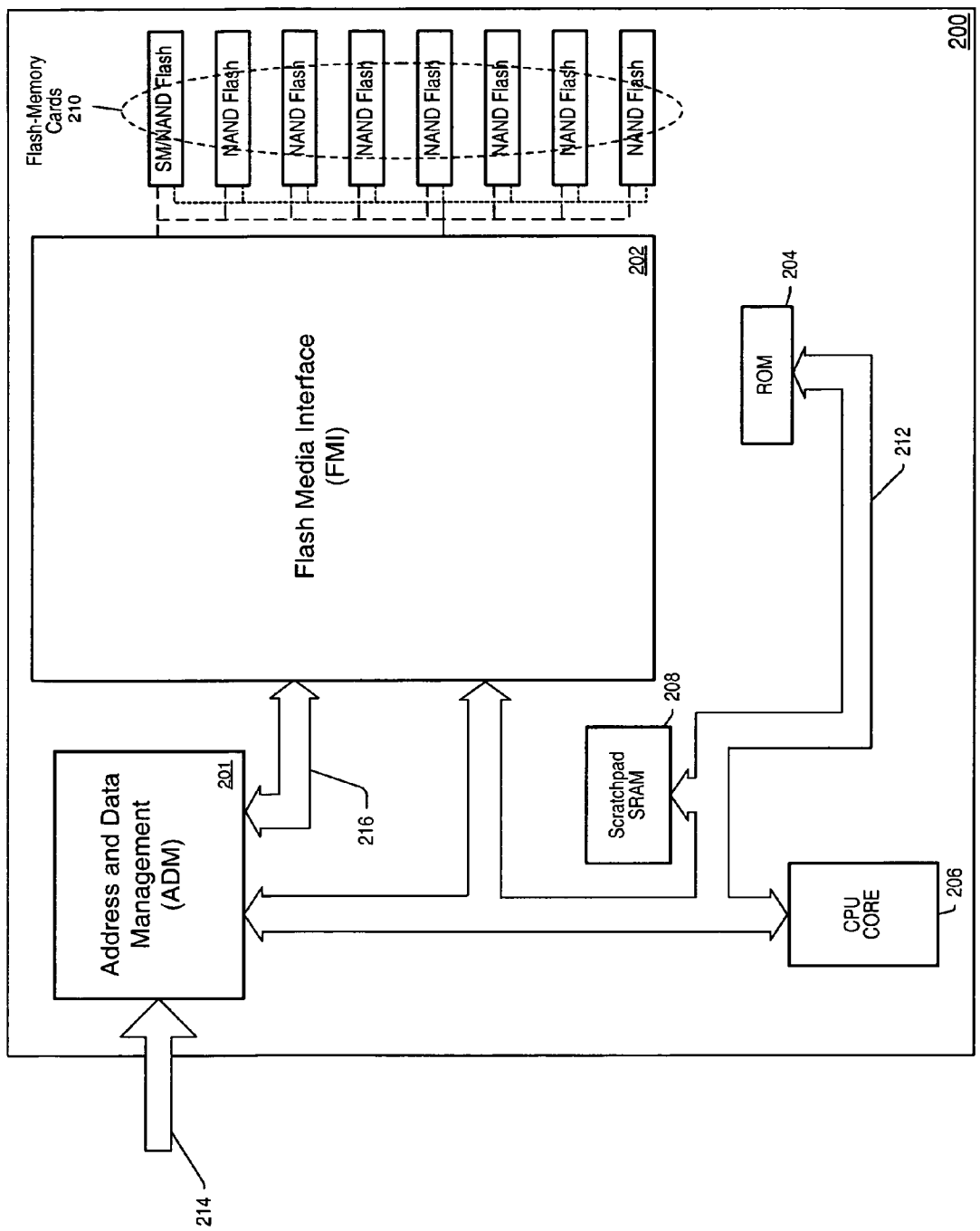
FIG. 2 shows the block diagram of a flash-memory controller according to one set of embodiments of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As referenced herein, the terms "flash-memory" and "flash-media" are used interchangeably to mean a special type of electrically erasable programmable read-only memory (EEPROM) that can be erased and reprogrammed in minimum erasable-units, referred to herein as 'blocks', instead of one byte at a time. In addition, each block may be organized into subunits called 'sectors', where a sector may represent a minimum data size for data stored on a given flash-memory device. While preferred embodiments are described in detail for flash-memory devices organized into blocks and sectors, alternate embodiments featuring other types of non-volatile memory devices organized into minimum erasable-units and subunits are possible and are contemplated. Therefore, it should be understood that "block", specifically, is used interchangeably with what is referred to generally as "erasable unit" or "EU" for short. As also used herein, "writing a sector" or "writing a subunit" means writing data to the sector or subunit, and a given sector or subunit is "used" when data has been written to it. Similarly, "erasing a sector" or "erasing a subunit" means erasing data that had previously been written to the sector or subunit, and a given sector or subunit is "unused" when no data has been written to it. Furthermore, subunits or sectors are said to be 'contiguous' if they have successive physical sector numbers (or addresses). Such subunits or sectors may or may not be physically located next to each other on a given device. Similarly, subunits or sectors are said to be 'non-contiguous' if they do not have successive physical sector numbers (or addresses). The same terminology is applicable for erasable-units or blocks and for the entire non-volatile memory device. 'Intervening copy operations' refer to the copying of pre-existing data on a given non-volatile memory device from one physical location to another physical location within the non-volatile memory device, or from the non-volatile memory device to an external memory, then back to the non-volatile memory device.

FIG. 2 illustrates one embodiment of a flash media controller (FMC) 200 used to transfer data from an external system to a flash-memory device. In this embodiment, bus 214 is used for transmitting address information and target data to FMC 200 from a host system, where target data refers to data that is to be written to flash-memory devices 210. FMC 200 may include a read-only memory (ROM) 204 configured to store control instructions for managing data transfer through flash media interface (FMI) 202 to/from flash-memory devices 210. The control instructions may be executed by central processing unit (CPU core) 206, which may be coupled to ROM 204, FMI 202 and to an address and management block (ADM) 201 via bus 212. ADM 201 may be configured to partially manage transmission of the target data from ADM 210 to FMI 202 via bus 216. Control information may also be transmitted to FMI 202 via bus 212. Data transfer to flash-memory devices 210 may take place according to the control instructions, which may be configured and/or written to reference and/or manage information for various data organization structures and indicators, thereby determining the operation of FMI 202.

As previously mentioned, data organization structures may include blocks and sectors, where a block may be representative of a minimum erasable-unit within any given one of flash-memory devices 210, and where a sector may be representative of a minimum data size for data stored within a given block. In one set of embodiments, the operation of FMI 202 may include tracking re-write operations on a per-sector basis, and writing new data directly to the flash-memory device. This may be accomplished through both block descriptors and sector descriptors used to track specified characteristics of all blocks within a given flash-memory device, and all sectors within a block.

Figure 3:
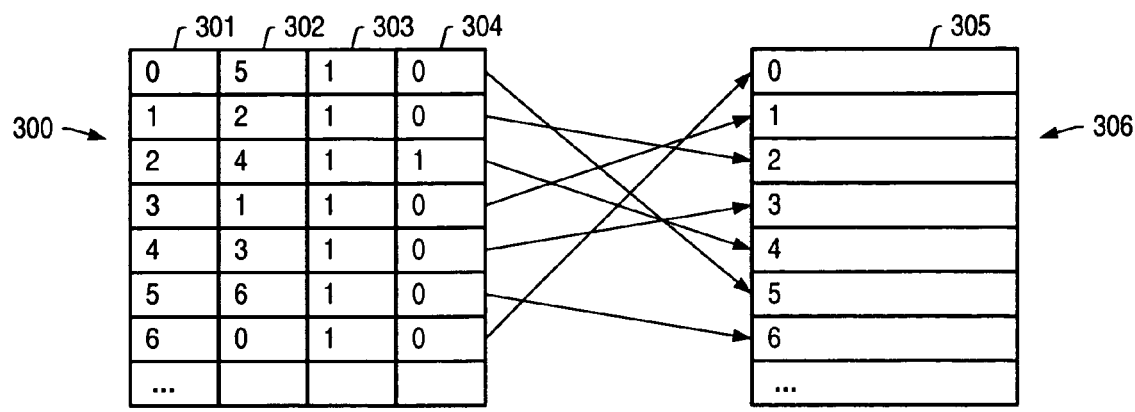
FIG. 3 illustrates a table of block descriptors according to one embodiment of the present invention.

Accordingly, FMC 200 may include a memory element SRAM 208, which may be used to store a table of block descriptors. The block descriptors may contain information pertaining to physical and logical blocks associated with the given flash-memory device. FIG. 3 shows the organization of one embodiment of a table 300 of block descriptors and a corresponding flash-media device 306 that contains physical blocks 305. In one embodiment, table 300 contains one entry for each logical block, as shown in column 301. Each logical block entry in column 301 may have a corresponding physical block number (or address), shown in column 302. The physical block number (from column 302) may be used by FMC 200 to convert a given logical block address into a physical block address for a given corresponding flash-memory device. The physical block number may also be used to convert a given physical block address into a logical block address for the given corresponding flash-memory device. For example, in FIG. 3, logical block 2 (from column 301) corresponds to physical block 4 (from column 305), as indicated by physical block number '4' in column 302.

Table 300 may also include a flag, shown in column 303, which may indicate whether a given logical block (from column 305) is bound to a physical block. For example, a '1' in column 303 for logical block number '2' (from column 301) may indicate that logical block number '2' is bound to physical block number '4' (from 305). A flag, shown in column 304, may indicate whether a given logical block is partially re-written. For example, a '1' in column 304 corresponding to logical block number '2' may indicate that logical block number '2' has been partially re-written.

Other embodiments may feature a table of descriptors that contains additional feature descriptors while omitting some of the descriptors previously described. One possible additional descriptor may be a flag indicating whether a given physical block contains damaged components (in which case the physical block is invalid and must not be used to store data). Another possible descriptor may be a flag indicating whether a given logical block is bound to more than one corresponding physical block. In such a case, the physical block number (or address) from column 302 may be considered the base address used for finding a split-block record. An additional flag may be used, similarly to the flag from column 303, to indicate whether a given physical block is bound to a logical block, and another distinct flag may be used to indicate whether a given physical block is completely erased.

In one embodiment, each split-block—that is, a physical block that is partially re-written; an occurrence when data is divided across two or more physical blocks—has a corresponding split-block record, otherwise referred to as a sector descriptor. Each split-block record may contain a 'next physical block' field, which represents a pointer to the next record in the split-block list. In this case, a next record may be indicating a preceding partially re-written physical block that is associated with the same logical block. A NULL value in the 'next' field of a given record may indicate that the record is the last one in the list. Each split-block record may also include a 'physical address' field containing the physical address of the corresponding block. For the first entry in the list, the value in the 'physical address' field may match the corresponding physical block number (or address), shown in column 302 of table 300. Additional fields may include a 'dirty sector' and a 'live sector' field, indicating the number of sectors in the block that contain data (including both "live" and "stale" sectors), and the number of sectors in the block that contain current data (that is, sectors that have not been replaced by a new block), respectively.

In one embodiment, each split-block record also includes a dirty-sector bitmap indicative of whether a given sector in the physical block contains data. The bitmap may contain a bit corresponding to each sector in the physical block. A clear-bit may indicate that a corresponding sector is unused, while a set-bit may indicate that the corresponding sector contains data. In one set of embodiments, an unused sector may actually contain all '1's, while a sector considered 'used' may contain data other than all '1's. The data may be stale—no longer current—due to a subsequent re-write operation, or it may be live.

Figure 4:
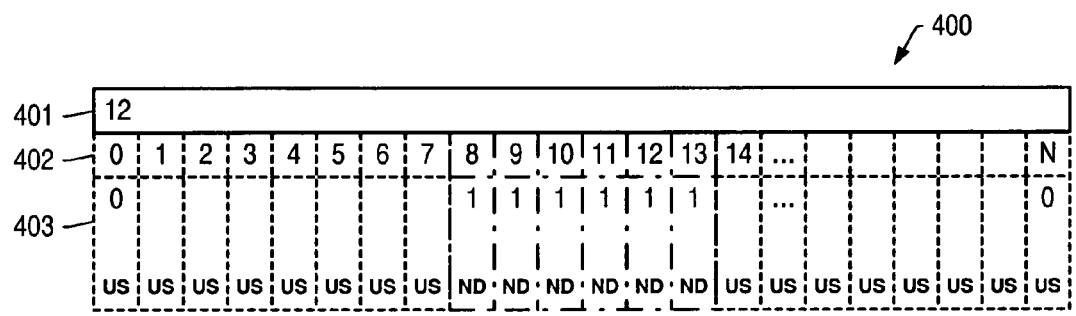
FIG. 4 illustrates a sector descriptor for a partially written physical block, according to one embodiment of the present invention.

FIG. 4 illustrates one embodiment of a sector descriptor for a partially written physical block. In this embodiment, sector descriptor 400 has a next physical block number 401 for a preceding partially re-written physical block associated with the same logical block, which in this example is '12'. Sector descriptor 400 also includes a dirty-sector bitmap, which contains a flag 403 corresponding to each sector in the physical block 402. In one embodiment, if the flag is clear (set to 0) then it indicates that the sector is unused, and if the bit is set (set to 1) then it indicates that the corresponding sector contains data.

In one embodiment, physical sector metadata is stored in a redundant area of the flash-memory device, the metadata being associated with each sector comprised in a physical block. The metadata may include a logical block address, a block version identifying the most recent version of each sector, and a flag indicating whether a sector has been erased. The physical sector metadata may be used in conjunction with the block descriptors and the split-block records (or sector descriptors) to track sector and block characteristics for each logical block. It should be noted that when the respective block descriptor flag indicates that a physical block has been erased—as described above—there is no need to further check the metadata to determine whether any sectors have been written.

In one set of embodiments, when an external system requests a re-write operation to any one of flash-memory devices 210, FMC 200 may operate as follows. A candidate physical block with the following attributes may be located:

1.) The physical block is already associated with the given logical block.
2.) The physical block is partially re-written.
3.) The sectors associated with the re-write operation are unused.

If a candidate physical block is not available, then an unbound physical block may be bound to the logical block and may become a new candidate physical block. A sector descriptor may be associated with the candidate physical block, and the next physical block number may be set to the most recent preceding physical block associated with the same logical block. The re-write operation may be processed using the candidate physical block. Finally, the dirty-sector map may be updated to indicate that the sectors associated with the re-write operation contain data.

FMC 200 may reclaim resources at will. In one embodiment, resources associated with a partially re-written block are reclaimed as follows. FMC 200 may select a candidate physical block for reclamation. FMC 200 may then select a subsequent partially re-written physical block associated with the same logical block, and may proceed to copy all dormant sectors from the candidate block to the subsequent block, where a dormant sector may be defined as meeting the following criteria:

a.) The sector is marked as dirty in the candidate physical block.
b.) The sector is marked as unused in the subsequent physical block.

Subsequently, FMC 200 may update the dirty-sector map associated with the subsequent block to reflect the sectors copied in the prior step, and may reclaim the sector descriptor associated with the candidate physical block. Finally, FMC 200 may mark the candidate physical block as unbound in the associated block descriptor.

In another embodiment, the dirty-sector bitmap is replaced with a dirty-sector list. In this embodiment, each element in the list may describe a range of sectors that contain data. The range may contain the number of a first sector that contains data, and the count of contiguous sectors that contain data. In yet another embodiment, the flag used in the block descriptor to indicate if a block is partially re-written is eliminated, and FMC 200 may determine that the block is re-written based on the existence of a sector descriptor. In yet another embodiment, the sector descriptor is written to the redundant area associated with each page or sector of the flash-memory device, allowing FMC 200 to recover the sector descriptor later. This may enable FMC 200 to recover data consistency after system shutdown and restart, or to reclaim resources without merging partially re-written blocks. In yet another embodiment, where the external system issues a sequence of re-write operations targeting dispersed (scattered) sectors that reside in distinct blocks on the flash-memory device, FMC 200 maintains a plurality of sector descriptor lists associated with each partially re-written logical block.

Large files or large sets of small files may typically be written to sequential sectors across the flash-memory device. Splitting the blocks during the transfer operation (that is, during the re-write operations) may eliminate redundant data copies. For example, in case a file larger than the size of a block is to be written, the write operation may be split into multiple writes, each write transferring data of a specified size that is smaller than the size of a block, and preferably larger than the size of a sector. FIGS. 5A through 5E show the sequence of events that occur during a series of consecutive re-write operations according to one embodiment, in which FMC 200 executes the re-write operations across block boundaries. In the diagrams of FIGS. 5A-E, FIG. 6A-C, FIG. 7, FIGS. 8A-B, and FIGS. 9A-D, the abbreviation 'US' refers to unused sectors, meaning that the sectors do not contain useful data, 'PD' refers to sectors containing previously written data, 'ND' refers to new data from a host, and 'SD' refers to sectors containing stale data, where stale data refers to data targeted to be updated by the (illustrated) re-write operation.

Figure 5A:
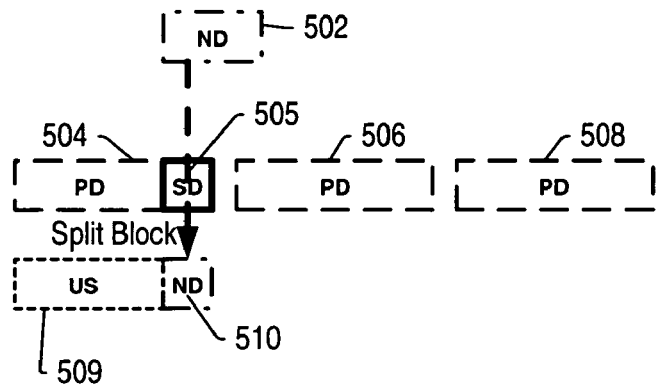
FIGS. 5(A-E) illustrate a sequence of events that occur during a series of consecutive re-write operations, according to one embodiment of the present invention.

FIG. 5A shows the start of the operation, beginning with a set of three previously written blocks 504, 506, and 508. In other words, blocks 504, 506, and 508 contain previously written data. The external system (for example, a personal computer acting as a host) may issue a re-write command, targeting an address that may currently correspond to tail section 505 of physical block 504. As shown in FIG. 5A, data to be written to the flash-memory device is represented by new-data 502. As noted, physical block 504 contains the first part of the data to be updated, shown as tail portion 505, which can be overwritten with a head portion of new data 502. The physical blocks containing the contiguous sectors of the rest of the existing data are represented by blocks 506 and 508. Previously written blocks 504, 506, and 508 currently represent the physical blocks referenced by address/addresses targeted by the host. FMC 200 may begin the re-write operation by acquiring an unused physical block 510, which is a physical block that contains no data, and generate a 'split-block'. Alternately, FMC 200 may allocate a new block that contains all stale data, erase the new block since all data contained therein is stale, designate the new block as the unused physical block, and generate a 'split-block'.

In generating the 'split-block', FMC 200 may write the head portion of new data 502 to the tail section 510 of newly allocated physical block 509. Thus, tail section 510 may now correspond to stale data section 505 of physical block 504. In other words, whereas the address targeted by the host prior to the start of the write operation referenced tail section 505 of physical block 504, that target address may now reference tail section 510 of physical block 509, as re-allocated by FMC 200. This condition/reallocation may be recorded in the split-block record (stored in SRAM 208, for example) by FMC 200.

Figure 5B:
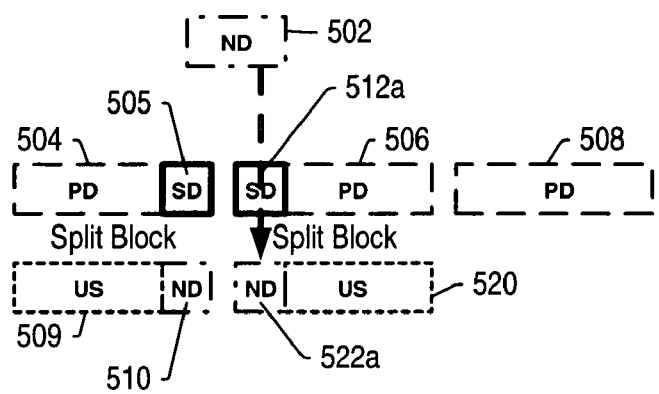

As shown in FIG. 5B, FMC 200 may next allocate new physical block 520, and continue writing a second portion of new data 502 to the head section 522a of physical block 520. Similarly to the previous 'split-block', the address (targeted by the host) that originally referenced head section 512a of physical block 506 may now reference head section 522a of physical block 520, as also re-allocated by FMC 200. Thus, data in head section 512a of physical block 506 may also be designated as stale by FMC 200.

Figure 5C:
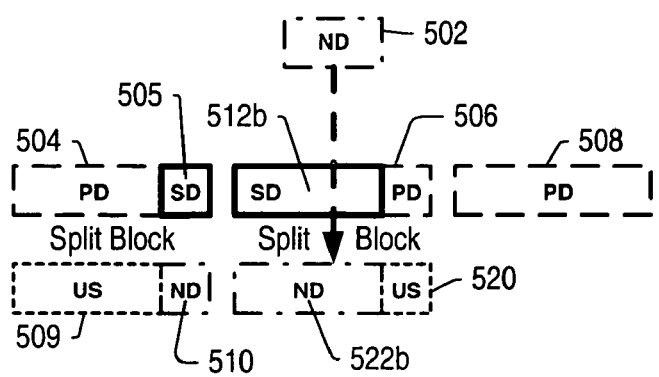

FIG. 5C illustrates a third portion of new data 502 being written to a center section of physical block 520, shown as section 522b that also comprises previously written head section 522a. Again, the address (targeted by the host) that originally referenced section 512b (also comprising previously written head section 512a) of physical block 506 may now reference section 522b of physical block 520, as also re-allocated by FMC 200.

Figure 5D:
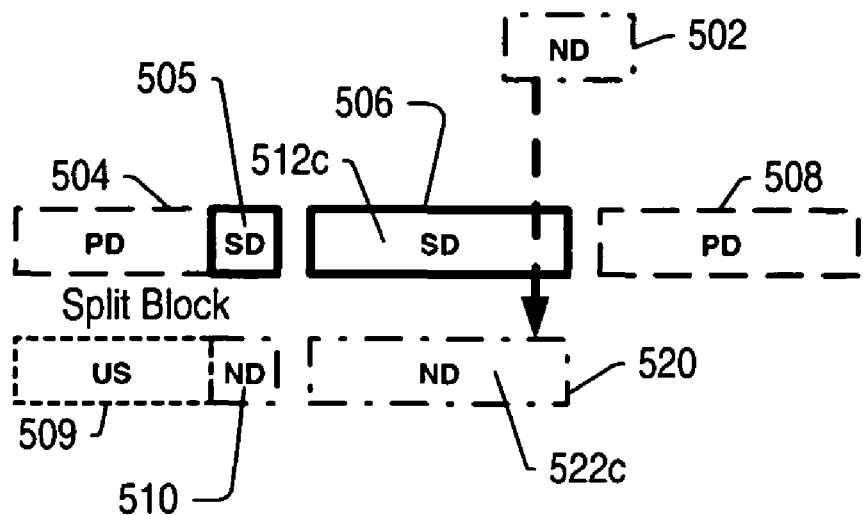

FIG. 5D illustrates a fourth portion of new data 502 being written to the tail section of physical block 520, shown as section 522c that also comprises previously written section 522b. Again, the address (targeted by the host) that originally referenced section 512c (also comprising previously written section 512b) of physical block 506 may now reference section 522c of physical block 520, as also re-allocated by FMC 200.

Figure 5E:
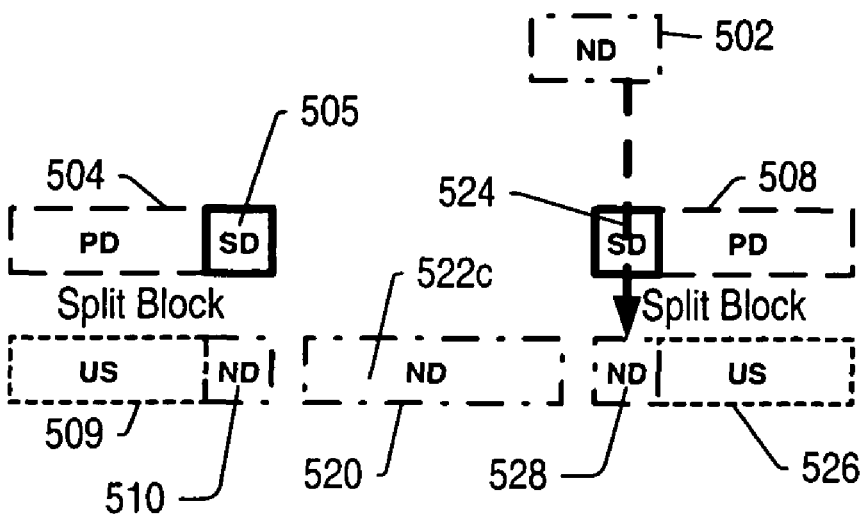

Finally, FIG. 5E illustrates the tail portion of new data 502 being written to the head section 528 of newly allocated physical block 526. As previously, the address (targeted by the host) that originally referenced head section 524 of physical block 508 may now reference head section 528 of physical block 526, as also re-allocated by FMC 200. Note also that at this point physical block 506 may be designated as containing all stale data, and may thus be erased and marked as an available physical block for subsequent re-write operations.

Figure 6A:
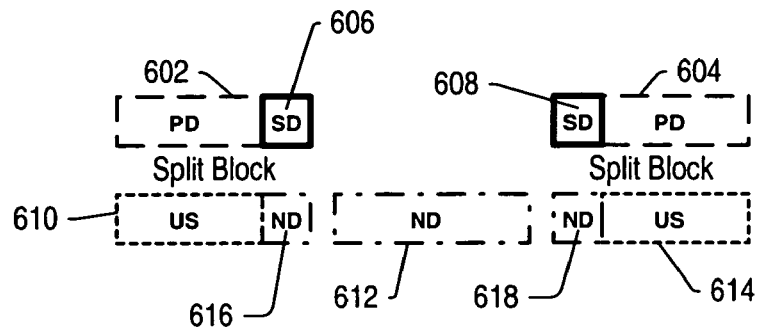
FIGS. 6(A-C) illustrate how split-blocks are condensed following a successful re-write operation, according to one embodiment of the present invention.
Figure 6B:
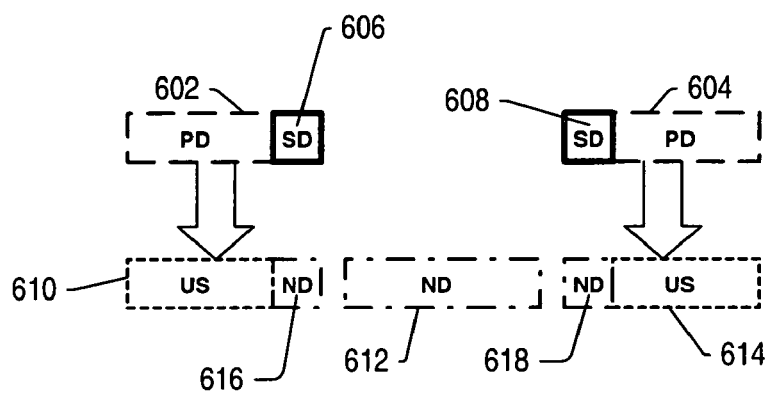
Figure 6C:
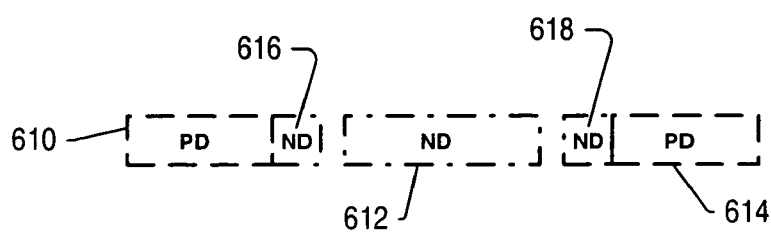

In one set of embodiments, FMC 200 may condense split-blocks following a successful re-write operation, as illustrated in FIGS. 6A through 6C. FIG. 6A shows the status of the split-blocks as they appear at the end of a re-write operation, for example the end status of a re-write operation as illustrated in FIG. 5E. As shown in FIG. 6B, FMC 200 may write the previously written data sectors of physical blocks 604 and 604 to the unused sectors of physical blocks 610 and 614, respectively. FMC 200 may now designate physical blocks 602 and 604 as being available as candidate blocks for future re-write operations, ending up with physical blocks 610, 612, and 614 holding the previously written data and the new data, as shown in FIG. 6C.

Figure 7:
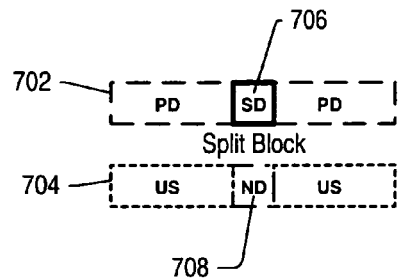
FIG. 7 illustrates how a small file is written, according to one embodiment.

FIG. 7 illustrates how a small file (a file of smaller size than a block) may be written, according to one embodiment. FMC 200 may designate new candidate physical block 704 and write the new data to section 708 as shown. The address (targeted by the host) that originally referenced section 706 of physical block 702 may now reference section 708 of physical block 704, as re-allocated by FMC 200. Data in section 706 may be designated as stale by FMC 200.

Figures 8A, 8B:
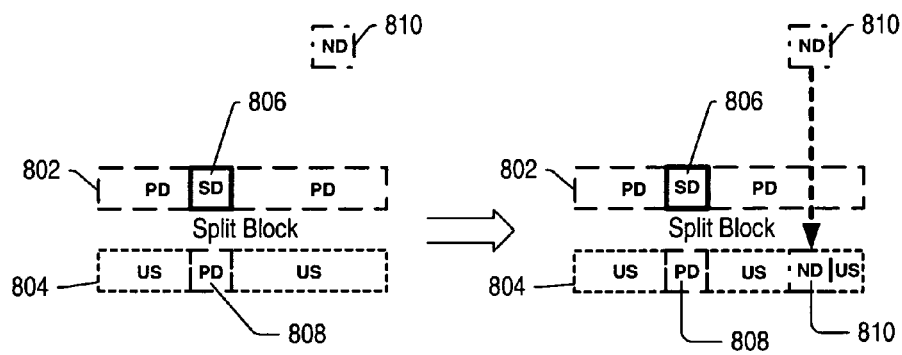
FIGS. 8(A-B) illustrate how a split-block is updated when writing a small file, according to one embodiment of the present invention.

FIGS. 8A-B illustrate how a split-block may be updated when writing a small file, according to one embodiment. As shown in FIG. 8A, upon the host requesting a re-write operation, FMC 200 may access physical block 804, which already contains a section 808 of previously written data. Again, the address originally targeted by the host may have been referencing section 806 of physical block 802, but may now be referencing section 808 of physical block 804, as previously re-allocated by FMC 200 (for example in a write operation as shown in FIG. 7). FMC 200 may write new data 810 to physical block 804, as shown in FIG. 8B.

Figures 9A, 9B, 9C, 9D:
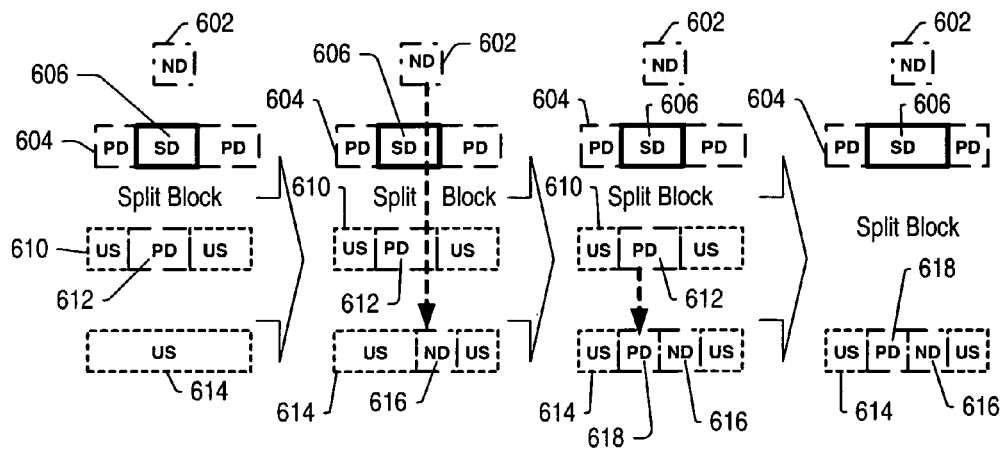
FIG. 9 illustrates how resources are reclaimed in one embodiment of the present invention.

FIGS. 9A-D illustrate how resources are reclaimed in one embodiment. In this embodiment, there may be multiple physical blocks associated with the same logical block. FIG. 9A shows a split-block comprising physical blocks 604 and 610, where previously written data in section 612 may represent data that has overwritten the now stale data shown in section 606. As shown, FMC 200 may allocate a new block 614 to service a new re-write operation that may be initiated by the host to write new data 602. New data 602 may be written to section 616 of newly allocated physical block 614, as illustrated in FIG. 9B. In this example, the new re-write operation results in a portion of new data 602 overwriting a portion of the previously written data shown in section 612. Therefore, as shown in FIG. 9C, data from physical blocks 610 and 614 may be merged together in physical block 614, where the non-updated portion of the previously written data in section 612 may be copied to the corresponding sectors 618 in physical block 614. Physical block 610 may then be erased and made available as a potential candidate block for future re-write operations. As shown in FIG. 9D, the result may be a single split-block comprising physical blocks 604 and 614.

In summary, referring to FIGS. 9A-D, FMC 200 may reclaim resources by copying data from a predecessor block (in this example sectors 612 of physical block 610) to a subsequent block (physical block 614). The predecessor block (physical block 610) may then be reclaimed. Note that reclaiming resources at this point may not necessarily be required. It may be preferable to defer the reclamation in case the external system issues a re-write of the data that would otherwise have been merged (the portion of the data in sectors 612 that was copied to sectors 618).

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A data transfer control system, the system comprising:
a memory element configured to store control instructions;
a processing unit coupled to the memory element and configured to execute the control instructions; and
a storage media interface coupled to the processing unit and configured to operate according to at least a corresponding portion of the control instructions for controlling data transfer to/from at least one non-volatile memory device, wherein the at least one non-volatile memory device comprises physical erasable-units, and wherein each physical erasable-unit comprises physical subunits;
wherein the storage media interface is configured to re-write old data that was previously written to at least one physical erasable-unit corresponding to a respective logical erasable-unit on the at least one non-volatile memory device by writing new data directly to the at least one non-volatile memory device; and
wherein in writing the new data directly to the at least one non-volatile memory device, the storage media interface is configured to:

dynamically select two or more physical erasable-units based on a relative position of available physical subunits within the physical erasable-units;

allocate the two or more physical erasable-units to the respective logical erasable-unit; and write the new data to one or more physical subunits of the two or more dynamically allocated physical erasable-units, wherein the relative position of the available physical subunits within each of the two or more dynamically allocated physical erasable-units matches a relative position of the old data within the at least one physical erasable-unit.

2. The system of claim 1, wherein in writing the new data directly to the at least one non-volatile memory device, the storage media interface is configured to write the new data to one or more contiguous and/or non-contiguous available physical subunits of the two or more dynamically allocated physical erasable-units.

3. The system of claim 1, wherein in writing the new data directly to the at least one non-volatile memory device, the storage media interface is configured to write the new data without intervening copy operations.

4. The system of claim 1, wherein in writing the new data directly to the at least one non-volatile memory device, the storage media interface is configured to perform a sequence of write operations targeted to non-contiguous available physical subunits of any dynamically allocated one or more of the physical erasable-units.

5. The system of claim 1, wherein in writing the new data directly to the at least one non-volatile memory device, the storage media interface is configured to write the new data to unused locations within the at least one non-volatile memory device.

6. The system of claim 1, wherein the storage media interface is configured to identify the two or more dynamically allocated physical erasable-units based on:

characteristics of a logical erasable-unit corresponding to the at least one physical erasable-unit.

7. The system of claim 6, wherein the storage media interface is configured to track characteristics of the logical erasable-unit and specified characteristics of each physical erasable-unit corresponding to the logical erasable-unit through at least a table that contains logical erasable-unit descriptors and physical erasable-unit records.

8. The system of claim 7, wherein the first memory element is further configured to store the table.

9. The system of claim 7, further comprising at least one additional memory element configured to store the table.

10. The system of claim 7 further comprising a plurality of additional memory elements, each one of the plurality of additional memory elements configured to store a respective portion of the table.

11. The system of claim 7, wherein each logical erasable-unit descriptor of the logical erasable-unit descriptors comprises:

a physical erasable-unit number, wherein based on the physical erasable-unit number, the storage media interface is configured to convert a given logical erasable-unit address into a corresponding physical erasable-unit address, and convert a given physical erasable-unit address into a corresponding logical erasable-unit address;

a first flag, wherein based on the first flag, the storage media interface is configured to determine whether a given logical erasable-unit is bound to a corresponding physical erasable-unit;

a second flag, wherein based on the second flag, the storage media interface is configured to determine whether a given physical erasable-unit comprises damaged components; and a third flag; wherein based on the third flag, the storage media interface is configured to determine whether the given logical erasable-unit is partially re-written.

12. The system of claim 7, wherein each physical erasable-unit record of the physical erasable-unit records comprises:

a bitmap, wherein based on the bitmap, the storage media interface is configured to determine whether a given physical subunit comprised in a corresponding physical erasable-unit contains data; and a number corresponding to a next physical erasable-unit, wherein the next physical erasable-unit succeeds a partially re-written physical erasable-unit, wherein the next physical erasable-unit and the partially re-written physical erasable-unit are associated with a same logical erasable-unit.

13. The system of claim 1, wherein the memory element is a read-only memory (ROM), the non-volatile memory device is a flash-memory device, the storage media interface is a flash-media interface, and the processing unit is one of:

a microprocessor; and a microcontroller.

14. The system of claim 13, wherein the physical erasable-units are physical blocks and the physical subunits are physical sectors.

15. A method for re-writing data on a non-volatile memory device, the method comprising:

receiving a request for a re-write operation targeting a non-volatile memory device that comprises physical erasable-units, wherein each physical erasable-unit comprises physical subunits, and wherein the re-write operation is performed to replace data associated with one or more specified logical erasable-units of the non-volatile memory device;

for each specified logical erasable-unit of the one or more specified logical erasable-units:

selecting respective one or more candidate physical erasable-units on the non-volatile memory device based on a relative position of one or more available physical subunits within each of the respective one or more candidate physical erasable-units;

allocating the respective one or more candidate physical erasable-units to the specified logical erasable-unit;

writing replacement data to the respective one or more physical candidate erasable-units; and updating and storing a respective record for each of the respective one or more candidate physical erasable-units, wherein the respective record comprises information indicating which physical subunits of the candidate physical erasable-unit corresponding to the respective record are affected by the re-write operation.

16. The method of claim 15, wherein said writing replacement data to the one or more candidate physical erasable-units further comprises writing data to contiguous physical subunits of one or more of the one or more physical candidate erasable-units.

17. The method of claim 15, further comprising updating, during a subsequent re-write operation, the respective record of each physical erasable-unit of the one or more candidate physical erasable-units targeted by the subsequent re-write operation.

18. The method of claim 15, further comprising storing a respective record for each partially re-written physical erasable-unit.

19. The method of claim 15, further comprising clearing the respective record of a given physical erasable-unit once data associated with all physical subunits of the given physical erasable-unit has been updated with replacement data in one or more other physical erasable-units.

20. The method of claim 15, wherein the re-write operation comprises a final copy phase, and wherein the method further comprises deferring the final copy phase.

21. The method of claim 15 wherein the re-write operation comprises a final copy phase, and wherein the method further comprises forcing completion of the final copy phase.

22. The method of claim 21, wherein said forcing completion of the final copy phase is in response to reaching resource limits for storing records;
wherein the method further comprises clearing the respective records of selected ones of the one or more specified physical erasable-units;
wherein data associated with all physical subunits of each of the selected ones of the one or more specified physical erasable-units has been updated with replacement data in physical erasable-units other than the selected ones of the one or more specified physical erasable-units.

23. The method of claim 15, wherein the non-volatile memory device is a flash-memory device, wherein the physical erasable-units are physical blocks, and wherein the physical subunits are physical sectors.

24. A method for re-writing data on a non-volatile memory device, the method comprising: receiving a request for a re-write operation targeting a non-volatile memory device that comprises physical erasable-units, wherein each physical erasable-unit comprises physical subunits, and wherein the re-write operation is performed to replace data associated with respective specified logical subunits corresponding to at least one specified logical erasable-unit of the non-volatile memory device; dynamically locating a partially written first physical erasable-unit already allocated to the at least one specified logical erasable-unit, wherein the first physical erasable-unit as a relative position occupied by a first portion of the respective specified logical subunits within the at least one specified logical erasable-unit; dynamically allocating at least a second physical erasable-unit to the at least one specified logical erasable-unit, wherein the at least second physical erasable-unit comprises unwritten second respective candidate physical subunits occupying a same relative position within the at least second physical erasable-unit as a relative position occupied by a second portion of the respective specified logical subunits within the at least one specified logical erasable-unit; writing replacement data to the first respective candidate physical subunits and to the second respective candidate physical subunits; and tracking respective specified characteristics corresponding to the at least one specified logical erasable-unit and to the first physical erasable-unit and at least second physical erasable-unit, wherein the respective specified characteristics comprise information indicating whether the data associated with the respective specified logical subunits has been replaced, and whether the first respective candidate physical subunits and second respective candidate physical subunits have been written.

25. The method of claim 24, wherein the first respective candidate physical subunits are non-contiguous; and wherein the second respective candidate physical subunits are non-contiguous.

26. A method for re-writing data on a non-volatile memory device, the method comprising: receiving a request for a re-write operation targeting a non-volatile memory device that comprises physical erasable-units, wherein each physical erasable-unit comprises physical subunits, and wherein the re-write operation is performed to replace data associated with specific logical subunits within a plurality of specific logical erasable-units of the non-volatile memory device; dynamically locating partially written candidate physical erasable-units each already allocated to a specific one of the plurality of specific logical erasable-units, wherein each respective one of the partially written candidate physical erasable-units comprises one or more unwritten respective candidate physical subunits occupying a same relative position within the respective one of the partially written physical erasable units as a relative position occupied by a corresponding one of the specific logical subunits within the specific one of the plurality of specific logical erasable-units; dynamically allocating at least one additional physical erasable-unit to the specific one of the plurality of specific logical erasable-units, wherein the at least one additional physical erasable-unit comprises unwritten respective candidate physical subunits occupying a same relative position within the at least one additional physical erasable-unit as a relative position occupied by corresponding ones of the specific logical subunits within the specific one of the plurality of logical erasable-units; writing replacement data to the respective candidate physical subunits comprised in the located candidate physical erasable-units and in the allocated at least one additional physical erasable-unit; and tracking respective specified characteristics corresponding to each of the specific logical erasable-units and to each candidate physical erasable-unit, wherein the respective specified characteristics comprise information indicating whether the data associated with the specific logical subunits has been replaced, and whether the candidate physical subunits have been written.

27. A method for re-writing data on a non-volatile memory device, the method comprising: receiving a request for a re-write operation targeting a non-volatile memory device that comprises physical erasable-units, wherein each physical erasable-unit comprises subunits, and wherein the re-write operation is performed to replace data associated with respective specified logical subunits within at least one specified logical erasable-unit of the non-volatile memory device; dynamically allocating, in response to said receiving, an unbound previously written physical erasable-unit and an unbound unwritten physical erasable-unit to the at least one specified logical erasable-unit, wherein the unbound previously written physical erasable-unit and the unbound unwritten physical erasable-unit each comprise respective candidate physical subunits occupying a same relative position within the unbound physical erasable-unit as at least a corresponding portion of the respective specified logical subunits within the at least one specified logical erasable-unit; erasing the dynamically allocated previously written physical erasable unit; generating a record containing specified characteristics corresponding to the specified logical erasable-unit and the associated physical erasable-units; writing replacement data to the respective candidate physical subunits; and updating the record with information indicating that the data associated with the at least a portion of the respective specified logical subunits has been replaced, and that the respective candidate physical subunits have been written.

28. A method for re-writing data on a non-volatile memory device, the method comprising: receiving a request for a re-write operation targeting a non-volatile memory device that comprises physical erasable-units, wherein each physical erasable-unit comprises subunits, and wherein the re-write operation is performed to replace data associated with respective specified logical subunits within a plurality of specified logical erasable-units of the non-volatile memory device; dynamically allocating, in response to said receiving, at least two unbound previously written physical erasable-units to at least one of the plurality of specified logical erasable-units, wherein each respective physical erasable-unit of the at least two unbound previously written respective physical erasable-units comprises respective candidate physical subunits occupying a same relative position within the unbound physical erasable-unit as respective ones of the at least one of the respective specified logical subunits within the plurality of specified logical erasable-units; erasing the dynamically allocated at least two previously written physical erasable units; generating a record containing specified characteristics corresponding to the plurality of specified logical erasable-units and the respective physical erasable-units; writing replacement data to the respective candidate physical subunits; and updating the record with information indicating that the data associated with the respective specified logical subunits has been replaced, and that the respective candidate physical subunits have been written.

29. The system of claim 1, wherein the storage media interface is configured to identify the available physical subunits of the two or more dynamically allocated physical erasable-units based on characteristics of each physical subunit of the two or more dynamically allocated physical erasable-units.

30. The method of claim 15, wherein said writing replacement data to the one or more candidate physical erasable-units comprises writing data to non-contiguous available physical subunits of one or more of the one or more candidate physical erasable-units.

31. A data transfer control system, the system comprising: a memory element configured to store control instructions; a processing unit coupled to the memory element and configured to execute the control instructions; and a storage media interface coupled to the processing unit and configured to operate according to at least a corresponding portion of the control instructions for controlling data transfer to/from at least one non-volatile memory device, wherein the at least one non-volatile memory device comprises erasable-units, and wherein each erasable-unit comprises subunits; wherein the storage media interface is configured to re-write old data that was previously written to the at least one non-volatile memory device by writing new data directly to the at least one non-volatile memory device; and wherein in writing the new data directly to the at least one non-volatile memory device, the storage media interface is configured to dynamically allocate two or more physical erasable-units to a same logical erasable-unit, and write the new data to one or more unwritten physical subunits of the two or more dynamically allocated physical erasable-units, wherein the one or more available physical subunits occupy same relative positions within the two or more physical erasable-units as the old data.

32. A data transfer control system, the system comprising: a memory element configured to store control instructions; a processing unit coupled to the memory element and configured to execute the control instructions; and a storage media interface coupled to the processing unit and configured to operate according to at least a corresponding portion of the control instructions for controlling data transfer to/from at least one non-volatile memory device, wherein the at least one non-volatile memory device comprises physical erasable-units, and wherein each physical erasable-unit comprises physical subunits; wherein the storage media interface is configured to re-write old data that was previously written to the at least one non-volatile memory device by writing new data directly to the at least one non-volatile memory device; and wherein in writing the new data directly to the at least one non-volatile memory device, the storage media interface is configured to: dynamically allocate two or more physical erasable-units based on relative positions of one or more unwritten physical subunits comprised in the dynamically allocated two ore more physical erasable-units, wherein the dynamically allocated two ore more physical erasable-units also contain one or more previously written physical subunits; and write the new data to the one or more unwritten physical subunits comprised in the dynamically allocated two ore more physical erasable-units, wherein the one or more available physical subunits are non-contiguous to the one or more previously written physical subunits.

* * * * *